Figure 1:
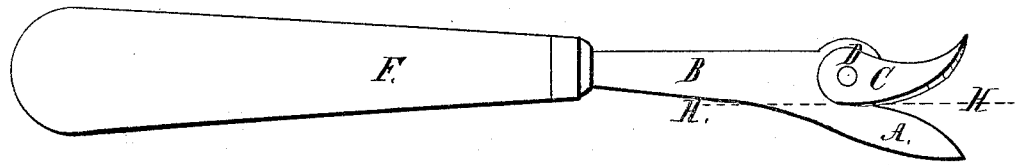
Figure 2:
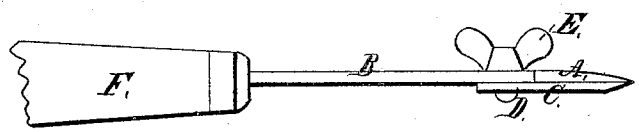
Figure 3:
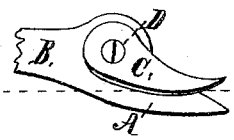

E. T. Orne,
Can Opener,
No 59,513. Patented Nov. 6, 1866.

Witnesses:
Geo. L. Chapin
A. Hayward

Inventor:
Eben T. Orne

UNITED STATES PATENT OFFICE

EBEN T. ORNE, OF CHICAGO, ILLINOIS, ASSIGNOR TO HIMSELF AND JOHN P. HART, OF SAME PLACE.

IMPROVED TOOL FOR OPENING CANS.

Specification forming part of Letters Patent No. 59,513, dated November 6, 1866.

*To all whom it may concern:*

Be it known that I, EBEN T. ORNE, of Chicago, in the county of Cook and State of Illinois, have invented a new and useful Improvement in a Tool for Opening Tin Cans; and I do hereby declare that the following is a full, clear, and exact description thereof, reference being had to the accompanying drawings and letters of reference marked thereon, making a part of this specification, in which—

Figure I is a longitudinal elevation of my tool for opening tin cans. Fig. II is a top view of the same. Fig. III shows the position that the adjustable cutter may occupy relative to the stationary cutter.

The nature of my invention consists in attaching an adjustable cutter to a sharp-pointed stationary cutter by means of a nut and screw, in order that the tool may present a sharp cutting-edge against the tin at any point on the cutters after one portion of the edge has become blunted by use; also, that the points of the cutters may be brought near enough together to prevent the point of the lower cutter from passing into the can far enough to disturb its contents. By this arrangement a tool is produced which is easily operated and not liable to get out of order, which is not the case when the revolving shears is operated against the stationary cutter, for the rivet connecting the two is liable to become worn, in which case the tin will pass in between the shears and cutter, and thus prevent the operation. Another advantage is gained by constructing the cutters in this manner, from the fact that no lathe-work is required either in the manufacture or resharpening.

To enable others skilled in the art to make and use my invention, I will describe the method of construction and operation.

A represents the stationary cutter, which is forged or cut from the same piece of cast-steel as the shank B. The end of the cutter is made pointed, so as to be easily thrust through the plate of the can, and the upper edge is beveled similar to the prongs of shears, in order to sever the tin. The adjustable cutter C is also made of cast-steel, and secured to the stationary cutter by means of the screw D and nut E. The lower edge of the adjustable cutter is beveled similar to the cutter A, the two edges fitting closely together, so as to prevent the possibility of the tin getting between them. F is the common handle, supporting the shank B, used for operating the cutters A C.

Operation: The tool must be grasped by the handle F, and the point of the stationary cutter thrust through the top plate of the can, (represented by the red line H H,) after which the tool must be forced forward in the direction that the opening is to be made. After any point of the edge becomes blunt the nut E can be loosened and the cutters shut together far enough to present a sharp edge to the tin.

Having thus fully described my invention, what I claim, and desire to secure by Letters Patent of the United States, is—

The adjustable cutter C, when constructed to operate against the stationary cutter A, substantially as and for the purpose set forth.

EBEN T. ORNE.

Witnesses:
GEO. L. CHAPIN,
A. HAYWARD.